Figure 1:
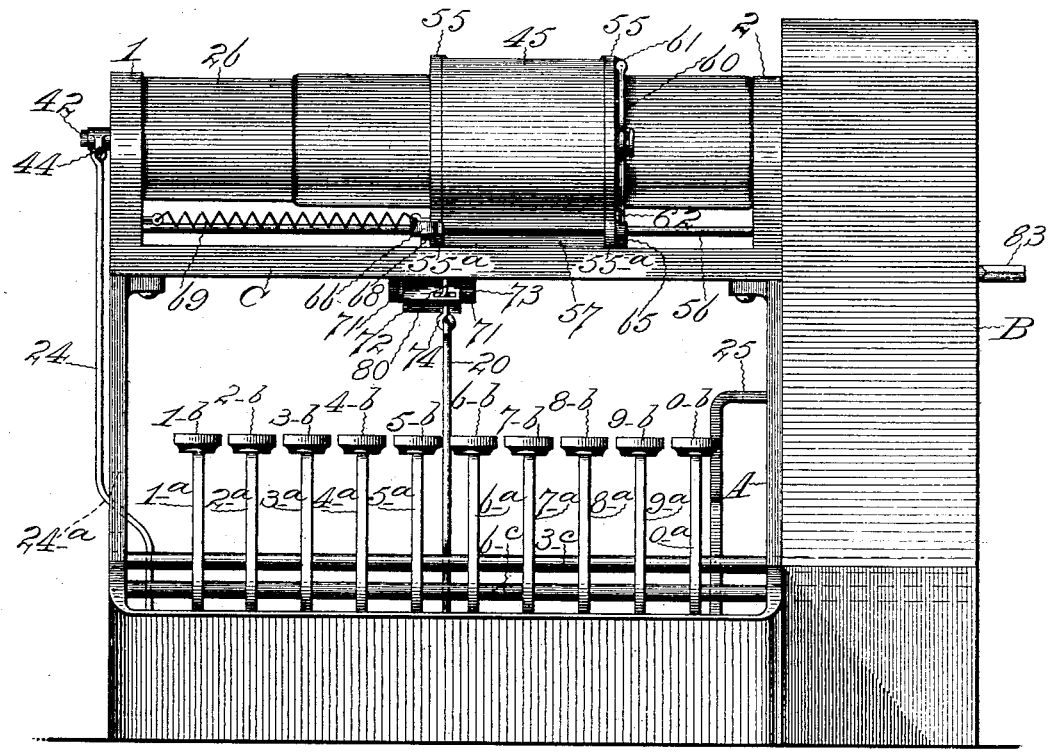

No. 763,966. PATENTED JULY 5, 1904.
B. M. DES JARDINS.
AUTOMATIC COMPUTING REGISTER.
APPLICATION FILED JAN. 12, 1899.
NO MODEL. 5 SHEETS—SHEET 1.

Witnesses:
William E. Neff
C. E. Buckland

Inventor:
Benj. M. Des Jardins
by J. A. Watson,
atty

No. 763,966. PATENTED JULY 5, 1904.
B. M. DES JARDINS.
AUTOMATIC COMPUTING REGISTER.
APPLICATION FILED JAN. 12, 1899.
NO MODEL. 5 SHEETS—SHEET 2.
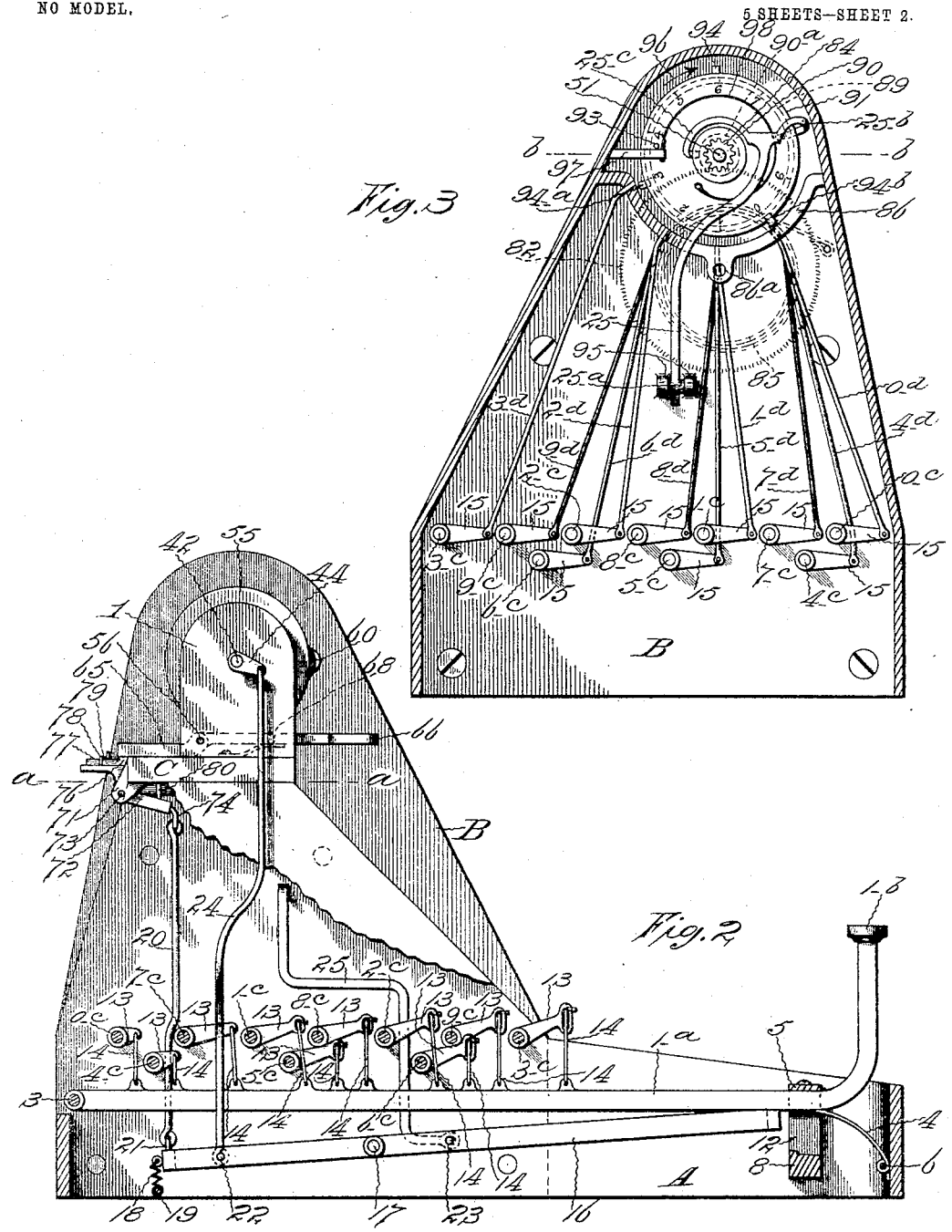

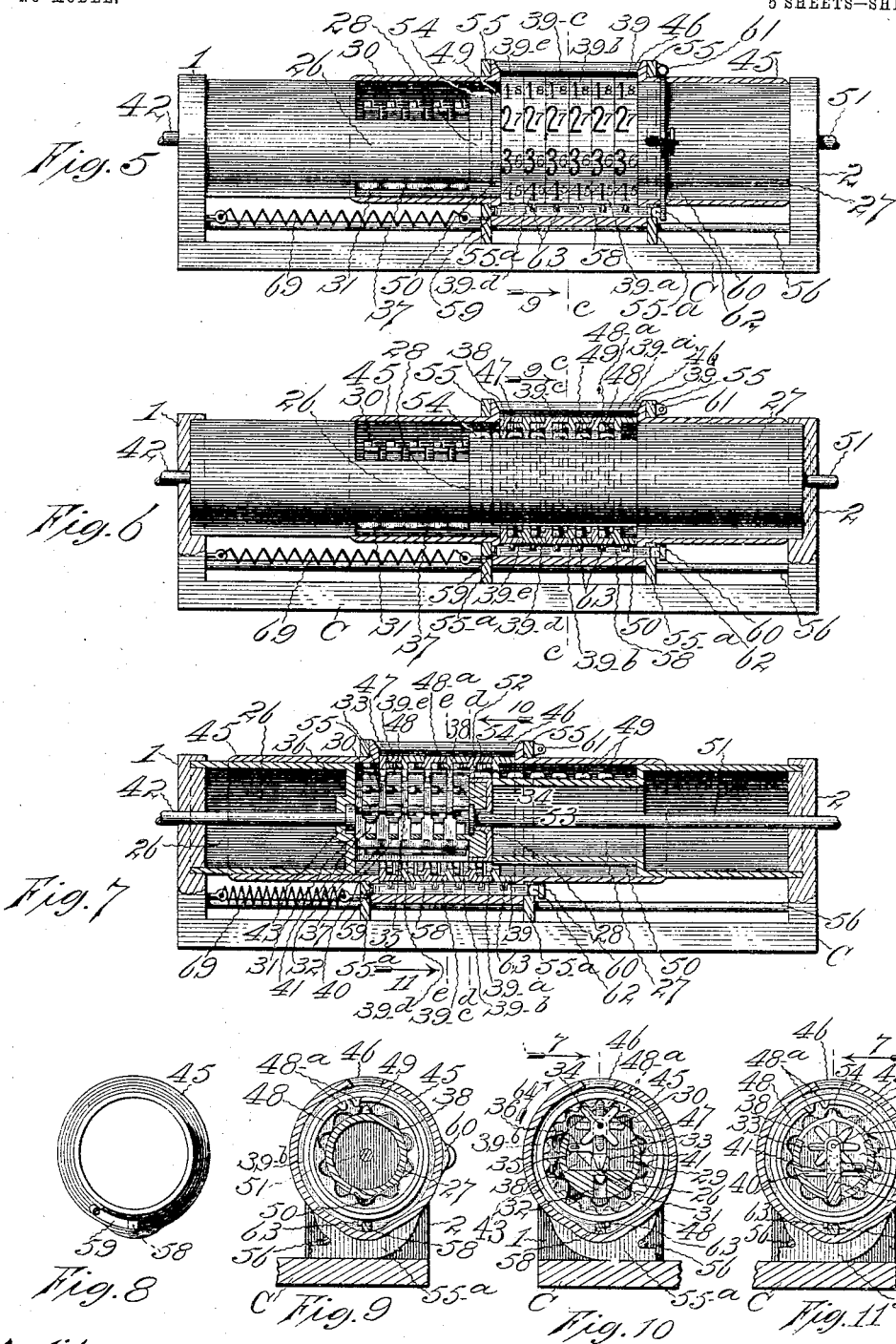

No. 763,966. PATENTED JULY 5, 1904.
B. M. DES JARDINS.
AUTOMATIC COMPUTING REGISTER.
APPLICATION FILED JAN. 12, 1899.
NO MODEL. 5 SHEETS—SHEET 5.

Witnesses:
William E. Neff
C. E. Buckland

Inventor:
Benj. M. Des Jardins
By F. H. Watson, atty

No. 763,966.

Patented July 5, 1904.

UNITED STATES PATENT OFFICE.

BENJAMIN M. DES JARDINS, OF WEST HARTFORD, CONNECTICUT, ASSIGNOR TO THE DES JARDINS COMPUTING REGISTER COMPANY, OF JERSEY CITY, NEW JERSEY, A CORPORATION OF NEW JERSEY.

AUTOMATIC COMPUTING-REGISTER.

SPECIFICATION forming part of Letters Patent No. 763,966, dated July 5, 1904.

Application filed January 12, 1899. Serial No. 701,981. (No model.)

*To all whom it may concern:*

Be it known that I, BENJAMIN M. DES JARDINS, a citizen of the United States, residing at West Hartford, in the county of Hartford and State of Connecticut, have invented certain new and useful Improvements in Automatic Computing-Registers, of which the following is a specification.

My invention relates to improvements in automatic computing-registers; and it consists, essentially, of a plurality of reciprocating coaxial independently-revoluble indicator rings or bands having figures delineated thereon, with the peculiar automatic means for turning one or more of said rings to perform the work of addition or subtraction by the action of any one of a series of figure-keys.

The objects of my improvement are, first, to produce an automatic device of the class designated above that greatly lessens the brain fatigue incidental to computing figures in the usual way and one which economizes much time by reason of its rapidity of action, the desired result being available as soon as the proper keys have been struck; second, to provide such a device capable of producing absolutely accurate computations, but one which at the same time is so simple in construction and operation as to require little or no experience for the successful manipulation of the same, the only condition being that the figures shall be indicated with as much care by actuating the proper keys as must be exercised in setting down the figures in the old way; third, to furnish an adding and subtracting machine at a comparatively low cost, and, fourth, to furnish said device in a compact form, whereby the machine comprising the same is made convenient for use or for being put away when not in use in a contracted space, as on or in one corner of a desk.

Different arrangements of the parts from those herein shown and described for producing the necessary results may be employed, together with mechanical equivalents of some or all of said parts, but I have utilized the present combinations for the production of a serviceable and practical register with the intention of claiming, broadly, the register so produced and the combinations forming constituent elements therein.

Figure 4:
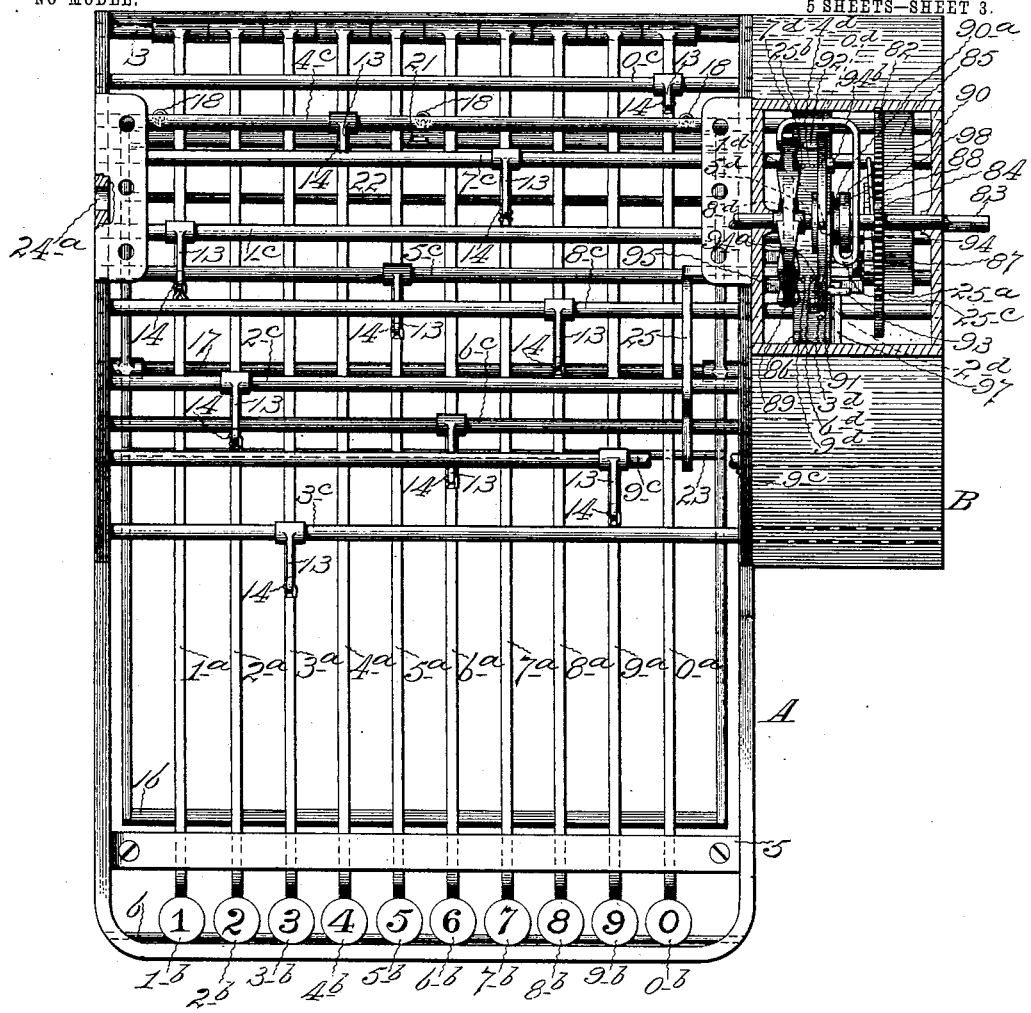
Figure 13:
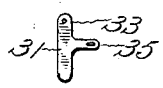
Figure 12:
Figure 14:
Figure 15:
Figure 16:
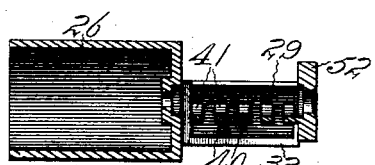
Figure 17:
Figure 18:
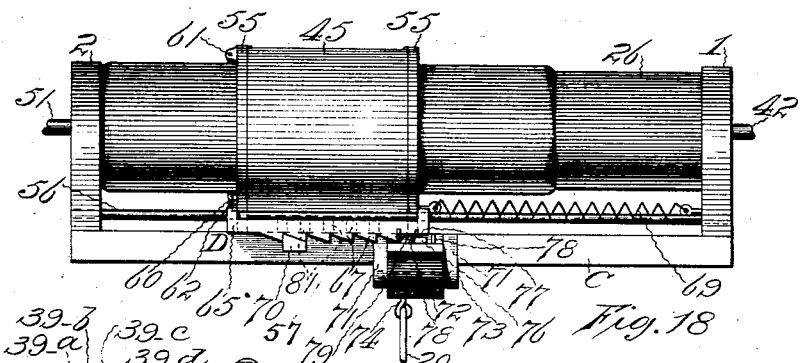
Figures 19, 20:
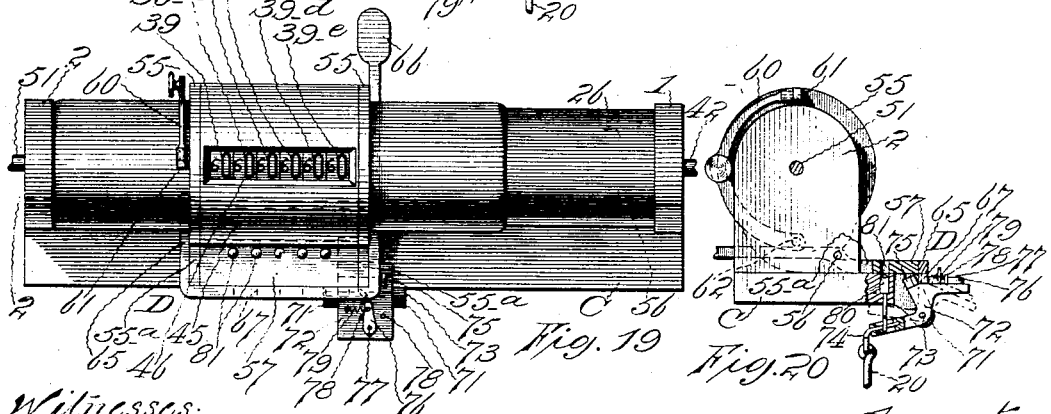

I attain the objects enumerated above by the mechanism illustrated in the accompanying drawings, in which Figure 1 is a front view of my machine; Fig. 2, a left side view of the same, a part of the frame being broken away to show the mechanism within; Fig. 3, a right side view of the escapement mechanism, the right side of the case containing said mechanism being removed and the clock-movement connected with the latter being in dotted lines to permit the parts behind the same to be seen; Fig. 4, a plan view of said machine below the bed of the register proper on lines $a$ $a$, Fig. 2, the upper portion of the escapement-mechanism case being also removed on lines $b$ $b$, Fig. 3, to show a top view of the parts within; Fig. 5, a front view and partial section of the register proper, showing the reciprocating members thereof at the extreme right-hand end of their travel and the blade and pinions depressed; Fig. 6, a similar view to the preceding one except that the indicator-rings are in section in this figure; Fig. 7, a longitudinal vertical section in the direction of the arrows 7, Figs. 10 and 11, showing said reciprocating members actuated to within one step of the end of their travel with the blade and pinions elevated; Fig. 8, a left end view of the case which incloses said indicator-rings; Fig. 9, a transverse vertical section on lines $c$ $c$, Figs. 5 and 6, in the direction of the arrows 9; Fig. 10, a transverse vertical section on lines $d$ $d$, Fig. 7, in the direction of the arrow 10; Fig. 11, a transverse vertical section on lines $e$ $e$, Fig. 7, in the direction of the arrow 11, showing the blade and pinions depressed, however, instead of elevated, as in the last-mentioned figure; Fig. 12, a side view of the locking-blade; Figs. 13, 14, and 15, end and bottom views of said blade; Fig. 16, a longitudinal vertical section through the blade and pinion carrier on lines $f$ $f$, Fig. 17;

Fig. 17, a top view of said carrier; Fig. 18, a rear view of said register proper with the escapement mechanism; Fig. 19, a plan view of the same, and Fig. 20 a right end view and partial section.

The drawings show the machine larger than is necessary in order to have the same operative for the sake of clearness in illustrating; but it will be readily understood that its practicability is not affected by any change in size within reasonable limitations.

Similar letters and figures refer to similar parts throughout the several views.

The frame A has the escapement-mechanism case B screwed or otherwise fastened to the right side thereof and supports the register-bed C, which is rigidly screwed to the top of said frame. The bed C comprises a horizontal base and the uprights 1 and 2 at the left and right ends thereof, respectively, and the members between said uprights may be said to constitute the register proper, which will be fully described farther along in this specification. The ten key-levers $1^a$, $2^a$, $3^a$, $4^a$, $5^a$, $6^a$, $7^a$, $8^a$, $9^a$, and $0^a$ have their rear ends loosely mounted on the shaft 3, journaled at the back of the frame A, and said levers extend forward, their upwardly-turned front ends terminating in the figure-keys $1^b$, $2^b$, $3^b$, $4^b$, $5^b$, $6^b$, $7^b$, $8^b$, $9^b$, and $0^b$, respectively. Beneath each of the levers $1^a$ $2^a$, &c., is a spring 4 to tension the former upward against the stop-bar 5. The springs 4 have their lower terminals wound around the rod 6, which extends across the front of the frame A and into the side thereof. The bar 5 is affixed to the guide-stop 8, rigid with the frame A and extending from side to side thereof, below the levers $1^a$, &c. The guide-stop 8 limits the downward movement of the levers $1^a$, &c., against the resiliency of the springs 4, each of said levers operating in a slot 12, provided in said stop to guide the same. The ten rock-shafts $1^c$, $2^c$, $3^c$, $4^c$, $5^c$, $6^c$, $7^c$, $8^c$, $9^c$, and $0^c$ extend above the key-levers $1^a$ $2^a$, &c., and are journaled in the frame A and the case B, three of said shafts being below the horizontal plane of the other seven for the purpose of economizing space. Intermediate of the ends of each of the shafts $1^c$ $2^c$, &c., is the forwardly-extending rocker-arm 13, connected by the rod 14 with the corresponding key-lever $1^a$ $2^a$, &c., so that when the lever $1^a$ is actuated the shaft $1^c$ is rocked thereby, the shaft $2^c$ being operated by the lever $2^a$, $3^c$ by $3^a$, &c. Some of the rocker-arms 13 are shorter than others and some have their ends slotted to compensate for the different positions occupied by the shafts $1^c$, &c., relative to the length of the levers $1^a$, &c., and to insure the same amount of movement in all of said shafts, as there is the same amount in all of said levers. Thus it will be seen that a full stroke of the lever $3^a$ will not turn the shaft $3^c$ for a greater distance than a full stroke of the lever $0^a$ will turn the shaft $0^c$, although the former shaft is farthest away from and the latter shaft nearest to the pivotal lever-shaft 3. The rock-shafts $1^c$, &c., are provided on their right terminals with the rearwardly-extending rocker-arms 15, these being within the case B.

The rocker 16 is mounted beneath the levers $1^a$, &c., on the shaft 17, journaled in the sides of the frame A, and consists, essentially, of a rigidly-constructed rectangular frame. The springs 18, which extend between the rear end of the rocker 16 and the rod 19, fixed in the frame A, serve to retain the front end of said rocker always in contact with one or all of the levers $1^a$, &c., according to whether or not a lever is depressed. When the levers $1^a$, &c., are at rest, the rear end of the rocker 16 is in its lowest position, and when any one of said levers is depressed to the full extent of its stroke said rear end is elevated to its highest position. In this manner a uniform movement is imparted to such members as are attached to said rocker at every stroke of said levers. The indicator-ring escapement-rod 20 is pivotally attached to the rear end of the rocker 16 at 21. The rocker 16 is provided with the fixed rods 22 and 23, respectively, behind and in front of the shaft 17. The lower terminal of the locking-blade-actuating rod 24 is pivotally attached to the rod 22, and the base of the shifter 25 is similarly attached to the rod 23, said base being slotted to allow for the arc-like path of travel of said rod 23.

The register proper is described as follows: The blade and pinion carrier 26 has its left-hand end rigidly secured to the upright 1 of the bed C, and the locking-plug 27 has its right-hand end secured to the upright 2 in like manner. The adjacent ends of the carrier 26 and the plug 27 are only separated by the driver 28. The carrier 26 is chambered at 29 to receive the five carrying-pinions 30 and the operating mechanism for the rising-and-falling pinion-carrying blade 31 and has the slot 32 extending through the bottom thereof for the accommodation of said blade. The blade 31 has the vertical arms 33, which carry the shaft 34 for the pinions 30, and the forwardly-extending lugs 35, slotted to receive the operating-pin 36, while the sides of the bottom of said blade are indented or corrugated, as shown at 37, for the purpose of alining the teeth 38 of the rings 39 $39^a$, &c., as hereinafter fully explained. The cross-bars 40 traverse the chamber 29 and have the upwardly-extending V-shaped ears 41 directly beneath the pinions 30 for the purpose of alining the teeth of said pinions when the latter are lowered. The shaft 42 has its bearings in the upright 1 and the carrier 26 and is rigidly connected with the pin 36 by the rocker-arm 43 on the right-hand end of said shaft. The rocker-arm 44, fast on the left-hand end of the shaft 42, connects the latter with the rod 24, which passes from the rocker 16 through the slot 24ᵃ in the left side of the frame A upward to be pivotally attached to said arm. The connections previously described cause the blade 31 to rise and fall each time that the rocker 16 is actuated.

Reciprocally mounted on the enlarged cylindrical heads of the carrier 26 and the plug 27 and the carriage D is the case 45, which incloses the interior mechanism of the register proper, including the six indicator-rings 39, 39ᵃ, 39ᵇ, 39ᶜ, 39ᵈ, and 39ᵉ, representing, respectively, units, tens, hundreds, thousands, tens of thousands, and hundreds of thousands. The case 45 is enlarged in the center to receive the rings 39 39ᵃ, &c., the outer faces of the end rings being contiguous to the ends of the enlarged portion of said case. The said rings have a lateral movement with the case 45 and a rotary motion upon the members encircled and within the chamber provided for their reception. Each of the rings 39 39ᵃ, &c., is provided on its periphery with the units from "1" to "9," inclusive, and the "0" in large characters for addition and in small characters for subtraction. The sight slot or opening 46 is cut in the top of the case 45 above the rings 39 39ᵃ, &c., of sufficient size to permit one large and one small figure on each of said rings to be seen when they are at rest, the construction being such that the uppermost figures thereon always line up beneath said opening except during the time of rotation of the same. Located within the rings 39ᵃ to 39ᵉ, inclusive, are the teeth 47, which are adapted to mesh with the pinions 30 when required to do so. Each of the rings 39 to 39ᵈ, inclusive, is provided with the left-hand annular flange 48, which fits into the contiguous ring, the flange on the ring 39ᵈ being received by the ring 39ᵉ, and the double-toothed segment 48ᵃ extends from said flange. The space between the two teeth that make up each of the segments 48ᵃ is continued into the integral flange 48, and said segment is also adapted to mesh with or engage the pinions 30. The segment 48ᵃ on each of the rings specified, like the flange 48, fits into the contiguous ring and turns therein at the right of the teeth 47, contained in said contiguous ring. The pitch of the segment-teeth and of the teeth 47 is the same. Every other tooth on each pinion 30 is wider than the following or preceding one, and the adjacent flange 48 rides on two of the wide teeth when said pinion is elevated to prevent the same from turning except when the narrow tooth between the two previously-mentioned is engaged by the segment 48ᵃ, at which time the pinion makes a partial revolution. These carrying-pinions and the serrated rings constitute a Geneva stop-movement, which is so well understood as to require no further specific description here. It will now be seen that every time the carrying-pinions 30 are elevated by the rocking of the shaft 42 their teeth mesh with the teeth 47 in as many rings 39ᵃ to 39ᵈ, inclusive, as said pinions are capable of engaging at the time the depression of a key takes place, and said pinion-teeth are also brought into the paths of the adjacent segment 48 through the medium of the blade 31 and intervening parts. When the blade 31 is lowered, the pinions 30 are withdrawn from the paths of the teeth 47 and the segments 48 and their lowest teeth are forced into contact with the ears 41 for the purpose of perfectly alining said last-mentioned teeth to insure accurate engagement the next time said pinions are raised, the friction between the parts being sufficient to retain them in the position fixed by said ears until again rotated by the the rings 39, &c. All of the rings 39 39ᵃ, &c., are provided with the internal driving-teeth 38 at the left of the teeth 47 in the various rings except the ring 39, which does not require the latter, but has the former. The teeth 38 number ten in each of said rings and extend inward considerably nearer the center than do the teeth 47, the rings being supported by the first-mentioned teeth either on the carriage 26, the driver 28, and the plug 27, or on the last two, or on the plug alone, according to location.

The locking-plug 27 has the external notched rib 49, adapted to engage the teeth 38 of such of the rings 39 39ᵃ, &c., as are contiguous thereto and prevent said rings from turning except when the latter are at the extreme right end of their travel, which position brings said teeth opposite the notches in said rib, and the rings can then be turned. The stop 70 is provided for holding the rings temporarily in their extreme right-hand position to assist in resetting them. The horizontal alinement-spring 50 extends across the contracted portion of the plug 27 to engage the teeth 38 of the said indicator-rings and insure the alinement of said teeth when they are opposite the notches in the rib 49. The shaft 51 has its bearings in the case B, the upright 2, and the right end 52 of the carrier 26, being connected to the latter by the disk 53. The annular driver 28 is rigidly attached to the shaft 51 between the end 52 and the plug 27 and is provided with the tooth 54, adapted to engage any of the teeth 38.

The ends of the enlarged portion of the case 45 are externally contiguous with the plates 55 55, the contracted portion or hub of said case passing through said plates. The plates 55 are prevented from turning upon the hub of the case 45 by the downwardly and rearwardly extending feet 55ᵃ 55ᵃ, which rest on the bed C, being held in place by the rod 56, extending between the uprights 1 and 2. The feet 55ᵃ are secured to opposite ends of the block 57, which also rests upon the bed C. In this manner an independent rotary movement is permitted the case 45; but said case must reciprocate with the plates 55. The plates 55 and the block 57 constitute the carriage D for the case 45 and inclosed rings. The case 45 is normally prevented from turning by the rectangular locking-bar 58, which extends beneath the rings 39, &c., into the left end of said case 45, through the right end of same, and into the right-hand plate 55, being held in this position by the flat spring 59. The spring 59 is fastened at one end to the outside of the left end of the case 45, and its free terminal bears against the end of the bar 58. The top of the semicircular arm 60 is pivoted at 61 to the right-hand plate 55, and said arm extends downward in front of the case 45, being equipped at the bottom with the pin 62, which enters said plate and bears against the end of the bar 58. The locking-bar 58 has notches in its upper side that register with the pins 63 when said bar is normally disposed. The pins 63 extend from the peripheries of the rings 39, &c., one to each of said rings. At the end of a computation the rings 39, &c., are returned to their initial positions against the resiliency of the spring 50 by pressing the arm 60 to the left until the bar 58 clears the right plate 55 and the notches in said bar are at the left of the paths of the pins 63 and then turning the case 45 backward in the direction of the arrow 64, Fig. 10, one complete revolution or until the spring 59 again forces said bar into engagement with said plate, pressure on said arm having meanwhile been removed. This last operation takes place while the ring-teeth 38 are in position to pass through the notches in the plug-rib 49 and brings all of the large ciphers on the rings 39, &c., beneath the opening 46, the bar 58 having engaged the pins 63 of each of said rings. The return of the bar 58 to the right has relocated its notches in a registering position relative to the pins 63 and presents no obstruction to the rotation of the rings 39, &c.; but the frictional contact of the spring 50 with the teeth 38 retains the latter in alinement at this time.

The initial detent, the escapement by means of which the carriage D is actuated one step at a time, and the alining and locking device will be next described. Any device or devices suitable for the purpose may be employed in lieu of the ones herein shown and explained.

The gate 65 consists of a back, side, and two end pieces, which latter are contiguous with the feet 55ª and are loosely pivoted around the rod 56, the left-end piece extending in front of the bed C and terminating in the key 66. The back of the gate 65 has the teeth 67 on its lower edge, said teeth being separated one from another by a distance equal to the width of an indicator-ring and depending over the rear edge of the bed C. The gate 65 normally rests upon the bed C under the influence of a flat spring 68, attached to said bed and rising beneath the key-arm of said gate. The carriage D is constantly tensioned to the left by the spiral spring 69, fastened at one end to the left-hand plate 55 and at the other to the upright 1. When the carriage D is at the right extremity of travel, it is held there by the stop 70 on the back of the bed C, which engages the last or right-hand tooth 67. An opening is provided in the bed C between the two depending lugs 71 to receive the escapement-arm 72, which is pivoted at 73 to said lugs. The top of the rod 20 is pivoted at 74 to the front end of the arm 72, and every time that the rocker 16 is actuated said arm is rocked on its pivot 73. On the top of the arm 72 is the fixed tooth 75 and the pawl 76, pivoted at 77 to said arm. The pins 78 78, which project upward from the arm 72 each side of the pawl 76, limit the vibration of the latter, so that its engaging end moves a distance corresponding to that which separates the teeth 67, and said pawl is normally held against the right-hand pin by the spring 79, extending from a pin in said arm to another in the pawl. The fixed tooth 75 and the pawl 76 are arranged at different angles on the arm 72 and so disposed that when the front of said arm is depressed said tooth engages the teeth 67 and when elevated, as shown by dotted lines in Fig. 20, said pawl engages said teeth 67. The lower end of the alining and locking plunger 80 enters a slot in the front end of the arm 72, where it is pivoted, and the upper terminal of said plunger operates in an opening in the bed C. The block 57 is provided with the five holes 81 of the same diameter as the head of the plunger 80, and said head is pointed and adapted to enter any one of said holes upon the elevation of the front end of the arm 72. The holes 81 are the same distance apart between centers as the width of one of the indicator-rings.

The operation of the above-described parts is as follows: By depressing the key 66 and raising the teeth 67 clear of the pawl 76 the carriage D may be fully moved to the right against the resiliency of the spring 69 until the last tooth 67 is in position to engage the stop 70, when said key is released and the reciprocating members of the register proper are held by said stop in their initial position, or, if in the position just mentioned, by raising the gate 65 the said reciprocating members may be moved by hand to the left until the desired tooth 67 is properly located for engagement with the pawl 76, when said gate is lowered. The spring 69 draws the carriage D to the left as far as the left-hand pin 78 permits the pawl 76 to vibrate. Now by raising the front end of the arm 72 the fixed tooth 75 is caused to engage and the pawl 76 to release the adjacent tooth 67, the spring 79 at once drawing said pawl into contact with the right-hand pin 78 in readiness to engage the next tooth 67. As the front of the arm 72 rises it elevates the plunger 80 into the registering-hole 81, thereby correcting any possible inaccuracy of the escapement in causing the rings 59, &c., to be properly located and locking the same in place while the driver 28 is rotated, as hereinafter fully explained. When the arm 72 is rocked back to its normal position, the plunger 80 is withdrawn from the block 51 and the tooth 75 removed from the path of the teeth 67, allowing the carriage D to be drawn by the spring 69 to the left the distance of one tooth 67 or until the pawl 76 encounters the left-hand pin 78. By repeating the action of the arm 72 the carriage D is actuated step by step until the extreme left end of its travel is reached.

The actuating and stop mechanism for the driver 28 is contained in the case B and will now be taken up. The driver-shaft 51, which extends through the case B, is driven by a simple clock-movement consisting of the gear 82 on the stud 83 and the intermeshing pinion 84 tight on said shaft, said gear being run by the spiral spring 85 subject to a certain peculiarly-constructed escapement operated by any one of the key-levers $1^a$ to $0^a$, inclusive, and the rocker 16. The stud 83 is journaled in the diaphragm 86 at $86^a$ and the right side of the case B, projecting beyond the latter to receive a key for winding the spring 85, the clock-movement being provided with the spring-actuated pawl 87 and the ratchet 88 at the left of the gear 82 to enable the same to be wound up. Any suitable source of power may be applied to the shaft 51 in place of the clock-movement. The driver-gear 89 is fast on the shaft 51 and has ten teeth on each side of its rim or flange. The sleeve 90 is splined on the shaft 51 at the right of the gear 89, so as to rotate with said shaft while having a longitudinal movement thereon. The driver stop-disk 91 is loosely mounted on the sleeve 90 and is provided with the following projections: the gear-engaging pin 92 from its left face, the stop-pin 93 from its right face, the stop 94 from its periphery, the stop $94^a$ from the left side of said periphery, and the stop $94^b$ from the right side of said periphery. Assuming that the periphery of the disk 91 is divided into ten equal parts which correspond to the number of teeth on each side of the gear 89, as shown in Fig. 3, (no such delineations being required in practice, however,) the stop $94^b$ is located at "0," the stop 94 at "6," and the stop $94^a$ at "3" for reasons presently to be given. The shifter 25, which is of a bell-crank-lever form, is pivoted at $25^a$ to the lugs 95, extending from the left side of the case B and has its lower terminal connected with the rocker 16, as hereinbefore stated. The upper end of the shifter 25 is bifurcated, and the rear bifurcation or arm $25^b$ extends around the gear 89 and normally engages the left-hand teeth thereon, while the front arm $25^c$ enters the groove $90^a$ in the sleeve 90. It will now be seen that every time the front of the rocker 16 is depressed the shifter-arms $25^b$ and $25^c$ swing to the left, the first of said arms releasing the gear 89 and the second one actuating the sleeve 90 and the disk 91 until the pin 92 engages the teeth on the right-hand side of said gear. Unless the shifter 25 was operated by striking the "0" key $0^b$ the clock-spring 85 immediately causes the gear 89 to rotate, and the disk 91 is carried around with said gear in the direction of the arrow 96, Fig. 3, until checked by some force superior to said spring. If the said "0" key is struck, no action of the gear 89 takes place, as will presently appear. Since the driver 28 is rigid with the same shaft as the gear 89, it follows that said driver will turn as far as said gear. For instance, if the disk 91 is checked after the gear has moved the distance of two teeth the driver moves a like distance and turns its engaging indicator-ring the distance of two of its teeth 38. These movements are quite rapid and take place upon the depression of the front part of the rocker 16, as stated, and when said rocker returns to its normal position the shifter 25 causes the disk 91 and the gear 89 to be disconnected, and the arm $25^b$ reëngages said gear, thereby holding the same against the action of the clock-movement. The rear end of the extension 97 from the front side of the case B lies in the path of the stop-pin 93, and the spring 98, having one end fastened to said extension and the other to the disk 91, serves to return the latter to its normal position with said pin bearing against the extension and the stop $94^b$ adjacent to the stop-finger $0^d$. When engaged and operated by the gear 89, the disk 91 is actuated against the resiliency of the spring 98, which is weaker than the clock-spring 85; but the instant these two members are disengaged said spring 98 returns said disk to its normal position.

The stop-fingers $1^d$, $2^d$, $3^d$, $4^d$, $5^d$, $6^d$, $7^d$, $8^d$, $9^d$, and $0^d$ are pivoted at their bases to the rear ends of the arms 15 on the shafts $1^c$, $2^c$, &c., respectively. The upper ends of the fingers $1^d$, $2^d$, &c., extend into suitable openings in the diaphragm 86, through which they operate, and when normally disposed said ends clear the arc of travel of the stops 94, $94^a$, and $94^b$. The diaphragm 86 extends across the case B from front to back beneath the disk 91. Said stop-fingers are so arranged as to group their upper ends in triplets side by side, with the exception of the finger $3^d$, which stands alone, the first or front group comprising the fingers $2^d$, $6^d$, and $9^d$, the second or middle group comprising the fingers $1^d$, $5^d$, and $8^d$, and the third or rear group the fingers $0^d$, $4^d$, and $7^d$, the fingers $2^d$, $1^d$, and $0^d$ being placed behind the finger $3^d$ in the order named, the fingers $6^d$, $5^d$, and $4^d$ being next in line from front to back, and, lastly, the fingers $9^d$, $8^d$, and $7^d$. When the disk 91 is in its normal position, the upper ends of the said stop-fingers are arranged around the lower portion of the periphery of said disk, as follows: the end of the finger $3^d$ adjacent to the division 3, Fig. 3, the ends of the front group adjacent to the division 2, those of the middle group adjacent to the division 1, and those of the rear group adjacent to the division 0. Thus three-tenths of the periphery of the disk 91 are always over the said stop-fingers, and by this compact and convenient arrangement of said fingers I am able to check said disk, and with it the gear 89, at a point representing or corresponding with any tooth on said gear by throwing up the requisite finger into the path of its engaging stop. To illustrate the operation of said stop-finger. Suppose the key $5^b$ for figure "5" be depressed. Its lever $5^a$ rocks the shaft $5^c$ and throws up the middle finger $5^d$ of the middle group into the path of the middle stop 94, the latter having been actuated to the left, with the disk 91, at the time said key was depressed by the rocker 16 and the shifter 25. The disk 91 now turns five points in the direction of the arrow 96 in Fig. 3, or the distance of five teeth on the gear 89, when the stop 94 encounters the finger $5^d$ and checks the revolution of the parts. When pressure on the figure-key $5^b$ is removed, the rocker 16 and lever $5^a$ are returned by their respective springs 19 and 4 to their former positions, thereby oscillating the shifter 25 to the right and withdrawing the finger $5^d$. This movement of the shifter 25 relocks the gear 89 and moves the disk 91 to the right, the spring 98 returning said disk to its starting-point. When the cipher-key $0^b$ is struck, the finger $0^d$ at once encounters the right-hand stop $94^b$ and prevents the disk 91 and gear 89 from turning.

Before proceeding with a description of the general operation of the computing-register I wish to call attention to the fact that more or less than six indicator-rings may be employed, with their coacting mechanism changed accordingly, without in any sense violating the spirit of my invention. Furthermore, I wish to state that my register can be used for subtraction, as well as for addition, by the simple expedient of inscribing a second series of figures on the peripheries of the indicator-rings in a certain arbitrary manner. This second series is distinguished from the first in any suitable manner, in this case being composed of figures that are considerably smaller than the others, and each figure in said second series consists of a digit which if subtracted from nine will leave the neighboring larger figure in the first series. The complete arrangement of the two series of ring-figures is as follows: The small "9" alternates with the large "0," the small "8" with the large "1," small "7" with large "2," "6" with "3," "5" with "4," "4" with "5," "3" with "6," "2" with "7," "1" with "8," and "0" with "9." The presence and arrangement of the figures on the indicator-rings noted above serve as a substitute for mechanism that would otherwise be required to reverse certain of the movements of the register in order to utilize the same for the process of subtraction, and said figures therefore constitute a valuable factor in my improvement.

The following concrete example, illustrating the process of adding and subtracting as performed by my register, is submitted to amplify the description of the operation of the several parts and insure a better and clearer understanding of the general operation of the whole machine. This example is intentionally shorter than those for which the register would ordinarily be employed to compute in order to avoid prolixity. X bought two bills of goods from Y, the first amounting to seven thousand nine hundred and five dollars and the second to five hundred and forty-eight dollars and fifty cents upon which he has paid the following amounts: six thousand seven hundred and fifty-one dollars and twenty-five cents, seventy-nine dollars, and six hundred and twenty-nine dollars and seventy-five cents. It is now desired to find the total amount of the bills and the balance due. It will be noticed from the appended explanation that the different items to be subtracted do not require to be added separately, the two processes being automatically performed at the same time and together. It will also be apparent that the numbers are dealt with by my machine in the same way as they would be ordinarily written—that is to say, the left-hand or largest denomination figure of the number is first disposed of, then the second largest, and so on, whether in addition or subtraction. The last feature removes any reasonable chance for confusion or mistake while using this register. Assuming that the carriage D is at the right end of its travel and the large ciphers on the indicator-rings are in place beneath the opening 46, the first requirement is to raise the gate 65 clear of the stop 70, move said carriage away from said stop, and allow the first tooth 67 to engage the pawl 76. The ring $39^e$ now encircles the driver 28, the driver-tooth 54 engaging the teeth 38, and the other indicator-rings are locked by the plug-rib 49. The depression of the key $7^b$ for the first figure of the first number to be computed through the medium of the intervening mechanism hereinbefore fully described causes the shifter 25 to release the gear 89 and connect the disk 91 with said gear, while at the same time throwing up the stop-finger $7^d$ into the path of the stop $94^a$, which, with said disk, is checked thereby after the latter has turned seven points. Synchronously with these performances and as a result of the same act the blade 31 and pinions 30 are elevated, the escapement-arm 72 changes position to engage the first tooth 67 by the fixed tooth 75 disengaging the pawl 76 and allowing it to move into position for a fresh engagement, and the plunger 80 is thrust into the first or left-hand hole 81 to perfectly aline the rings 39, &c., with their engaging members and hold them against lateral movement during the rotation of the driver 28 and the ring 39ᶜ. The rotation of the gear 89 by the clock-movement until stopped at the seventh tooth, as previously indicated, has caused the driver 28 to turn the ring 39ᵉ a like number of teeth 38 and expose the large "7" at the opening 46 instead of the cipher. The release of pressure on the key 7ᵇ and the return of the rocker 16 to its former position causes the plunger 80 to release the carriage D, while the fixed tooth 75 is disengaged from the first tooth 67, and the pawl 76 engages the second tooth 67, allowing said carriage to move one notch to locate the ring 39ᵈ in operative relation with the driver 28. At the same time the blade 31 descends with the pinions 30, the former engaging the teeth 38 of the rings 39ᵉ and locking the same, the shifter 25 having meanwhile reëngaged the gear 89 and permitted the disk 91 to resume its normal position and the finger 7ᵈ returned to its former place. The rings 39 to 39ᶜ are still held by the rib 49. The depression and elevation of the key 9ᵇ for the next figure in the first number results in substantially the same movements as the depression of the key 7ᵇ, with the exception of throwing up the stop-finger 9ᵈ in place of 7ᵈ, by reason of which the ring 39ᵈ exposes "9" at the opening 46 and the ring 39ᵉ moves to engage the driver 28, the first-mentioned ring being locked by the blade 31 within the ring 39ᵉ. The key 0ᵇ is only struck for the purpose of actuating the carriage D one tooth, as it is not desired to change the "0" exposed on the ring 39ᶜ, to obviate which change the stop-finger 0ᵈ is arranged to prevent any rotation of the disk 91 and the gear 89 when said key is used. The key 5ᵇ is next struck, which brings "5" on the ring 39ᵇ below the opening 46, leaving the ring 39ᵃ in engagement with the driver. Since the ciphers which constitute the last two figures in the first number are already represented beneath the opening 46 on the rings 39ᵃ and 39 and further movement to the left of the carriage D is not required at this time, it is unnecessary of course to strike the key 0ᵇ; but said carriage is at once moved to the right until the second tooth 67 again engages the pawl 76, when the mechanism is prepared for the next number. The carriage D is returned to the second tooth 67 instead of the first, because the first figure in the second number is in the tens-of-thousands place and in the previous instance the first figure was in the hundreds-of-thousands place. As the carriage D is moved to the right the corrugated base of the blade 31 alines the teeth 38 in the rings 39ᵇ and 39ᶜ, inclusive, so that the 39ᵇ, 39ᶜ, and 39ᵈ can return to their positions around the plug 27 and the driver 28 and all of said rings remain in the several positions allotted to them by said driver. Since the rings 39ᵃ and 39 did not pass beyond the alining influence of the driver and plug, they are still held in their initial positions. It will be noticed that the pinions 30 have as yet had no occasion to perform any work. The key 5ᵇ for the first figure in the second number is next struck, resulting in turning the ring 39ᵈ now engaged by the driver 28 five points in addition to the nine points previously covered and exposing a "4" at the case-opening 46, while the right-hand pinion 30 is rotated by the segment 48ᵃ belonging to said ring sufficiently to move the ring 39ᵉ one point or tooth 38 and change the exposed "7" to "8." Pressure on the key 4ᵇ results in moving the ring 39ᶜ four teeth 38 and exposes a "4." The key 8ᵇ gives a "3" on the ring 39ᵇ and "5" on the ring 39ᶜ. The key 5ᵇ gives the same figure at the opening 46 and the "0" is left as before. The number composed of the figures "845350," which shows through the case-opening, is the answer sought. It is obvious that a column of figures representing any amount within the capacity of the register can be as readily and accurately added as the two numbers herein employed for an illustration.

From the result above obtained certain amounts are to be subtracted, in order to do which with any device it becomes necessary to strike the figure-keys representing the alternates of the figures comprised in said result or the small figures on the indicator-rings associated therewith; but this is not done until said rings have been reset, the figures in the above-mentioned result, with their alternates, first being noted on a slip of paper. The resetting of the indicator-rings consists, briefly, in actuating the carriage D so as to bring the last tooth 67 into contact with the stop 70, compressing the semicircular arm 60 to release the case 45 and engage all of the displaced indicator-rings, revolving said case to initially dispose said rings, and bringing the first tooth 67 into engagement with the pawl 76. Manipulate the figure-key representing the alternates of "845350" or "154649," which immediately appear as the large characters at the opening 46. The keys struck to produce this number are 1ᵇ, 5ᵇ, 4ᵇ, 6ᵇ, 4ᵇ, and 9ᵇ. The machine is now in readiness to proceed in precisely the same way as for addition. The large figures "154649" change to "829774" when "675,125" are added thereto, which in turn become "837674" after "7900" have been indicated by manipulating the corresponding keys for the first two figures, and finally the addition of "62975" produces "900649" at the opening 46 in larger figures, the small figures or alternates of which "99350" being the correct result of the subtraction. The indicator-rings are again reset and the machine is prepared for the next example.

What I claim as my invention, and desire to secure by Letters Patent, is—

1. In an automatic computing-register, the combination with a series of register-wheels having internal teeth, of a driver arranged within said wheels, said wheels and driver being relatively movable thereto step by step, and carrying devices also arranged within said wheels.

2. In an automatic computing-register, the combination with a casing having a sight-opening, of a series of register-wheels mounted within the casing and provided with internal teeth, a driver arranged within said wheels, said wheels and driver being relatively movable, and carrying devices also arranged within said wheels.

3. In an automatic computing-register, the combination with a cylindrical casing having a sight-opening, of a series of register-wheels mounted within the casing and provided with internal teeth, a locking-blade within the wheels and movable into and out of engagement with said teeth, and a driver and carrying devices also arranged within said register-wheels.

4. In an automatic computing-register, the combination with a cylindrical casing having a sight-opening, of a series of register-wheels mounted within the casing and provided with internal teeth, a corresponding series of carrying-pinions, and means for moving said casing with its contained mechanism step by step.

5. In an automatic computing-register, the combination with the cylindrical casing capable of longitudinal and rotary movement, of the carriage and escapement mechanism controlling the longitudinal movement of said casing, the register-wheels within the casing and each provided with an alining projection, and the notched bar normally arranged to permit said alining projections to pass, said bar being movable into the path of said projections for the purpose of alining the register-wheels.

6. In an automatic computing-register, the combination with a series of indicator-rings, of a driver coaxial with said rings, a series of internal teeth on each ring adapted to engage with the driver, a series of carrying-pinions, a second series of teeth on each ring adapted to engage with the carrying-pinions, and a toothed segment on each ring also adapted to engage with the carrying-pinions.

7. In an automatic computing-register, the combination with a cylindrical casing, and a series of indicator-rings contained therein, of a series of carrying-pinions, the said pinions being movable radially of the indicator-rings and the said rings being movable laterally or in the direction of their axis, whereby the rings are engaged by the several carrying-pinions successively.

8. In an automatic computing-register, the combination with a cylindrical casing, a series of indicator-rings contained therein, and means for moving said casing and rings step by step in the direction of their axis, of a driver coaxial with the rings, a series of carrying-pinions adjacent to the driver, means for moving said pinions into engagement with the indicator-rings, and means for holding said carrying-pinions in engagement with the indicator-rings during the operation of the driver and for holding said pinions out of engagement with said rings during the lateral movement of the rings, for the purpose set forth.

9. In an automatic computing-register, the combination with the cylindrical casing having a sight-opening, and the indicator-rings rotatably mounted within the casing, of means for moving said casing and rings step by step, a series of carrying-pinions adapted to coöperate with teeth on the interior of the rings, a carrier upon which said pinions are mounted, said carrier being movable radially to withdraw the pinions from engagement with the rings, a rock-shaft having an arm connected with said carrier, a keyboard, a universal bar operated by the key-levers thereof, and connections between said bar and said rock-shaft whereby upon the depression of any key the pinions will be thrown outward into engagement with the register-wheels, for the purpose set forth.

10. In an automatic computing-register, the combination with a series of indicator-rings having internal teeth, of an internal driver therefor, means for moving the rings step by step over the driver, and a notched locking-rib 49 arranged to aline the teeth of said rings prior to their engagement with the driver, for the purpose set forth.

11. In an automatic computing-register, the combination with the series of toothed indicator-rings, of the carrying-pinions, a pinion-carrying blade 31, a keyboard, and connections between the keyboard and the pinion-carrying blade, whereby upon the depression of any key the blade is operated to carry the pinions successively into and out of engagement with the rings, for the purpose set forth.

12. In an automatic computing-register, the combination with the indicator-rings, of the carrying-pinions, the movable blade in which said pinions are mounted, means for moving the blade to carry the pinions into and out of engagement with the rings, and the alining device arranged to aline the teeth of the pinions when they are out of engagement with the rings.

13. In an automatic computing-register, the combination with a series of indicator-rings having internal teeth, of two cylindrical bearings upon which said teeth ride to support the rings, and a rotatable driver between and in line with said bearings, for the purpose set forth.

14. In an automatic computing-register, in combination with the figure-key levers, a plurality of coaxial revoluble indicator-rings having teeth, a locking and alining blade having a corrugated edge adapted to intermittently engage said teeth, and means for actuating said rings in one direction and reciprocating said blade at right angles thereto coincidently with the action of any one of said levers, for the purpose set forth.

15. In an automatic computing-register, in combination with a plurality of coaxial revoluble indicator-rings having teeth, a rising and falling blade carrying a series of pinions capable of intermittently engaging certain of said teeth, and means adapted to lock and aline said pinions when at rest, for the purpose set forth.

16. In an automatic computing-register, in combination, a rotary driver, a series of vertically-reciprocating pinions, and a plurality of coaxial indicator-rings having teeth, said rings being shiftable so that while certain of said rings engage said driver certain others of said rings engage said pinions, whereby any one of said rings may be rotated and in turn rotate one or more of the inactive rings, for the purpose set forth.

17. In an automatic computing-register, in combination with a series of figure-key levers, a driver, a series of pinions, a plurality of coaxial indicator-rings having teeth, certain of which are capable of engaging with said driver and certain others with said pinions, means for actuating said pinions into conjunction with the said rings coincidently with the action of any one of said levers, and means for rotating said driver and engaging ring and elevating said pinions coincidently with said action, whereby motion is imparted to one or more of the inactive rings from the one turned by said driver, for the purpose set forth.

18. In an automatic computing-register, in combination with a plurality of coaxial indicator-rings, a driver capable of rotating any one of said rings, and a laterally-reciprocating blade adapted to lock the latter after they are disengaged from said driver, for the purpose set forth.

19. In an automatic computing-register, in combination with a series of figure-key levers, a plurality of coaxial indicator-rings, a driver, a laterally-reciprocating blade adapted to engage said rings, and means for actuating said rings and rotating said driver coincidently with the action of any one of said levers, for the purpose set forth.

20. In an automatic computing-register, in combination, a plurality of reciprocating coaxial indicator-rings, a rotary driver adapted to engage and turn any one of said rings, and a plug and blade on opposite sides of said driver, arranged to lock and aline such of said rings as are not under the influence of said driver, for the purpose set forth.

21. In an automatic computing-register, in combination, a series of figure-key levers, a plurality of coaxial indicator-rings, a driver, a plug, and a blade, means for actuating said rings coincidently with the action of any one of said levers, whereby said driver engages one or another of each rings, the others being locked and alined by said plug and blade, and means for rotating said driver and engaged ring coincidently with said action, for the purpose set forth.

22. In a computing-register, in combination, a carriage, a rotatable case mounted in said carriage and normally locked thereto, a plurality of revoluble indicator-rings in said case, means for engaging the rings with the case, and means for unlocking the latter to rotate said rings to their initial positions, for the purpose set forth.

23. In a computing-register, in combination with a plurality of indicator-rings having peripheral pins, a carriage supporting an inclosing case for said rings, a laterally-movable notched bar arranged to normally lock said case to said carriage, the notches in said bar registering with said pins, and a member capable of displacing said bar to unlock said case and engage said pins whereby a revolution of the former rotates said rings to their initial positions, for the purpose set forth.

24. In a computing-register, in combination with a plurality of indicator-rings having teeth and peripheral pins, a locking-plug provided with a notched rib adapted to engage said teeth except when they register with the notches in said rib, means for yieldingly engaging said rings, a carriage supporting an inclosing case for said rings, a laterally-movable notched bar arranged to normally lock said case to said carriage, the notches in said bar registering with said pins, and a member capable of displacing said bar to unlock said case and engage said pins whereby a revolution of the former rotates said rings to their initial positions, for the purpose set forth.

25. In an automatic computing-register, in combination, a series of figure-key levers, a carriage, a rotatable case mounted in said carriage and normally locked thereto, a plurality of coaxial indicator-rings in said case, means for variously disposing said rings consequent upon the action of said levers, and means for unlocking said case to rotate said rings to their initial positions, for the purpose set forth.

26. In an automatic computing-register, in combination, a series of figure-key levers, a plurality of indicator-rings having peripheral pins, a carriage, an inclosing case for said rings, mounted in said carriage and normally locked thereto by a laterally-movable notched bar, the notches in said bar registering with said pins, means for variously disposing said rings consequent upon the action of said levers, and a member capable of displacing said bar to unlock said case and engage said pins whereby a revolution of the former rotates said rings to their initial positions, for the purpose set forth.

27. In an automatic computing-register, in combination, a series of figure-key levers, a plurality of coaxial indicator-rings having teeth and peripheral pins, means for variously disposing said rings consequent upon the action of said levers, a locking-plug provided with a notched rib adapted to engage the teeth of the encircling rings except when they register with the notches in said rib, means for yieldingly engaging said rings, a carriage supporting an inclosing case for said rings, a laterally-movable notched bar arranged to normally lock said case to said carriage, the notches in said bar registering with said pins, and a member capable of displacing said bar to unlock said case and engage said pins whereby a revolution of the former rotates said rings to their initial positions, for the purpose set forth.

28. In an automatic computing-register, in combination with a series of figure-key levers, a reciprocating carriage having a perforated block sliding on a suitable bed, and a plunger dependent for its action upon the manipulation of any one of said levers, said plunger being adapted to lock said carriage to said bed at each action of said levers, for the purpose set forth.

29. In an automatic computing-register, in combination with a series of figure-key levers, a rotary driver and shaft therefor, a source of power for said driver, a stop-disk in the line of transmission of said power, means for normally locking the driver-shaft, means for connecting the stop-disk with said shaft and releasing the shaft, means for variably stopping the rotation of the disk and shaft after such release, and means for returning the disk to its normal position and relocking the shaft.

30. In an automatic computing-register, in combination with a series of figure-key levers, a rotary driver, a source of power for said driver, a gear and a stop-disk in the line of transmission of said power, and an escapement operated by said levers, arranged to engage and disengage said disk and gear, whereby the rotary motion of said driver is governed, for the purpose set forth.

31. In an automatic computing-register, in combination with a series of figure-key levers, a rotary driver, a source of power for said driver, a gear and a stop-disk in the line of transmission of said power, and a shifter operated by any one of said levers, for alternately engaging said disk with said gear and unlocking the latter, and disengaging said last-mentioned parts and relocking said gear, for the purpose set forth.

32. In an automatic computing-register, in combination with a series of figure-key levers, a rotary driver, a source of power for said driver, a gear and a disk having stops thereon in the line of transmission of said power, a shifter operated by any one of said levers, for alternately engaging said disk with said gear and unlocking the latter, and disengaging said last-mentioned parts and relocking said gear, and a series of stop-fingers adapted to be introduced singly, by the corresponding levers, into the path of said stops to check the rotary motion of said disk, for the purpose set forth.

33. In an automatic computing-register, in combination with a series of figure-key levers, a rotary driver, a source of power for said driver, a gear and a disk having stops thereon in the line of transmission of said power, a shifter operated by any one of said levers, for alternately engaging said disk with said gear and unlocking the latter and disengaging said last-mentioned parts and relocking said gear, a series of stop-fingers adapted to be introduced singly, by the corresponding levers, into the path of said stops to check the rotary motion of said disk, and means for returning said disk to an initial point of rest when free from said gear, for the purpose set forth.

34. In an automatic computing-register, in combination with a series of figure-key levers, the driver-escapement mechanism consisting of a gear, means for rotating the same, a laterally-movable disk, means for rotating the latter when free, in the opposite direction to the motion of said gear, an oscillating shifter operated by any one of said levers, capable of locking and releasing said gear and engaging and disengaging said disk therewith, and a series of lever-actuated fingers arranged to check the revolution of said disk when under the influence of said gear, for the purpose set forth.

35. In a computing mechanism, a series of indicator-rings, a casing surrounding said rings, and devices whereby the rings are restored to zero by the revolution of the casing.

36. In a computing mechanism, the combination of a series of indicator-rings, a casing surrounding said rings and provided with a sight-opening, said casing being rotatable, and means rotatable with the casing for restoring the indicator-rings to zero.

37. In a computing mechanism, the combination with a series of indicator-rings and a casing surrounding said rings and provided with a sight-opening, of a bar carried by the casing and normally out of engagement with the rings, and means for moving the bar into engagement with the rings, whereby when the casing is turned the rings will be restored to zero.

38. In a computing mechanism, the combination of a series of indicator-rings arranged side by side, means for supporting said rings, and an independently-supported casing, surrounding said rings and provided with a sight-opening, and means carried by the casing and adapted to restore the rings to zero when the casing is turned about its axis.

39. In a computing mechanism, the combination of a series of rotatable indicator-rings arranged side by side, and an independently-supported rotatable casing having a sight-opening, said casing surrounding and being coaxial with said rings.

40. In a computing mechanism, the combination of a series of indicator-rings, each having a projecting pin, of a rotatable casing surrounding said rings and provided with a sight-opening, a slide-bar mounted in said casing and having notches, means for normally holding said bar in position to permit the pins on said rings to pass through the notches, said bar being shiftable into position to intercept the pins on the rings.

41. In a computing mechanism, the combination of a series of indicator-rings, each having a pin or projection, a bar movable into the paths of said pins or projections, and means for rotating the bar about the axis of the rings to restore said rings to zero.

In testimony whereof I affix my signature in presence of two witnesses.

BENJ. M. DES JARDINS.

Witnesses:
J. A. WATSON,
W. CLARENCE DUVALL.